(No Model.)
D. C. BOWEN.
RAIL PULLER.
No. 490,383. Patented Jan. 24, 1893.
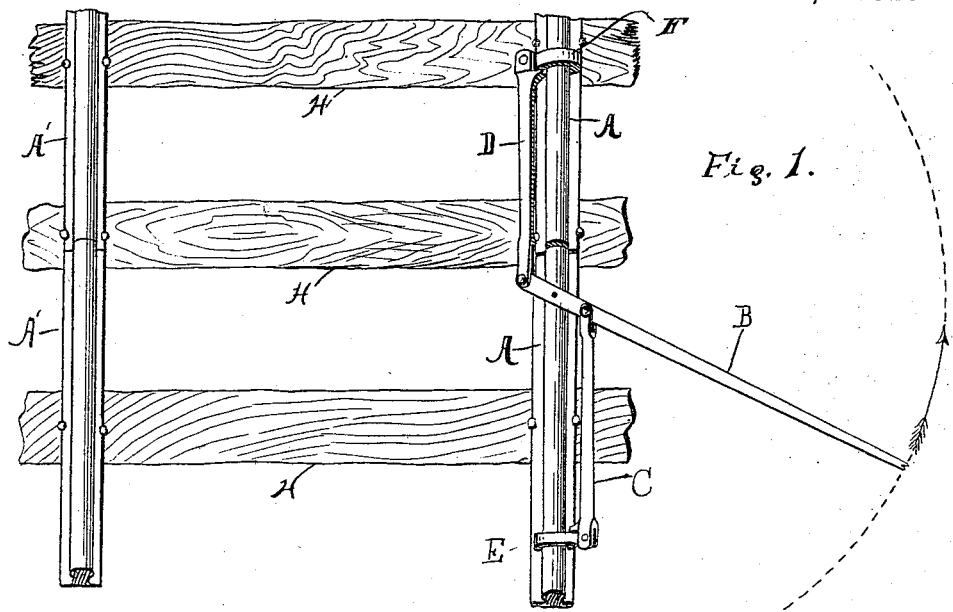
Fig. 1.
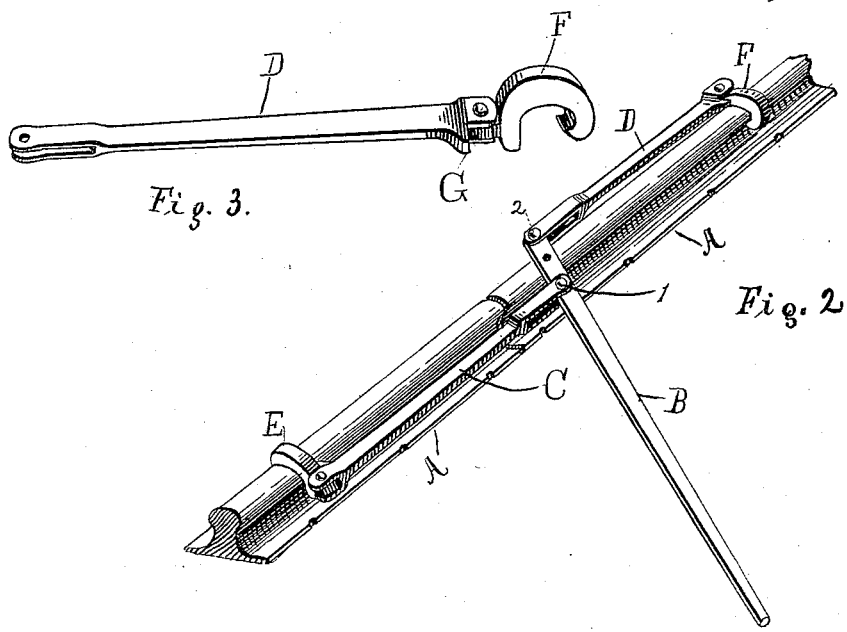
Fig. 3.
Fig. 2.
WITNESSES:
Grace E. Chapman
Adolph B. Mason
INVENTOR
Daniel C. Bowen
BY
Cyrus E. Perkins
ATTORNEY.

UNITED STATES PATENT OFFICE.

DANIEL C. BOWEN, OF GRAND RAPIDS, MICHIGAN.

RAIL-PULLER.

SPECIFICATION forming part of Letters Patent No. 490,383, dated January 24, 1893.

Application filed May 21, 1892. Serial No. 433,916. (No model.)

*To all whom it may concern:*

Be it known that I, DANIEL C. BOWEN, a citizen of the United States, residing at Grand Rapids, in the county of Kent and State of Michigan, have invented certain new and useful Improvements in Railroad-Rail Pullers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1. is a plan view as applied to rails. Fig. 2. is a view in perspective of same. Fig. 3. is a view in detail of one of the connecting rods and clutches.

My invention has for its object a compound lever and clutches adapted for application to railway rails for the purpose of pulling them together as they lie in use upon the ties and road bed and have separated at the joints. I do this by means of a mechanical device illustrated in the accompanying drawings and which I describe as follows:

A A are rails fastened to ties H. H. H by spikes in the customary way. A', A', are companion rails.

B is the lever handle. C and D are projecting rods with jaws at both ends, and attached to the lever handle by hand pins 1 and 2 and having at the outer ends the clutch hooks E. F. hinged therein.

The rod D has a shoulder G. (see Fig. 3) for the purpose of keeping clutch hook square upon rail when lever is reversed and so preventing any gripping of hook and rail.

By means of this device sufficient leverage is furnished so that, upon removing fish plates, rails upon any ordinary track may be easily pulled together at a great saving of time and labor over methods hitherto in use.

Having thus described my invention what I claim as novel and for which I desire to secure Letters Patent of the United States, is:

1. The combination of the lever handle B, right and left connecting rods C and D, the shoulder G on said connecting rod D and clutch hooks E and F reversed as to each other so as to fit opposite sides of adjoining rails, as shown and for the purpose described.

2. The combination of the lever handle B. connecting rods C—D. connected to said handle by the removable hand pins 1—2 and having jaws at both ends, and the clutch hooks E—F. hinged to said rods, all substantially as set forth and described.

In testimony whereof I affix my signature in presence of two witnesses.

DANIEL C. BOWEN.

Witnesses:
 ADOLPH B. MASON,
 GRACE G. CHAPMAN.